(12) United States Patent
Giménez Abad

(10) Patent No.: US 9,296,486 B2
(45) Date of Patent: Mar. 29, 2016

(54) IN-FLIGHT REFUELING SYSTEMS WITH A DIGITAL COMMUNICATION SUB-SYSTEM

(71) Applicant: EADS CONSTRUCCIONES AERONAUTICAS, S.A., Madrid (ES)

(72) Inventor: Luis Fernando Giménez Abad, Madrid (ES)

(73) Assignee: EADS Construcciones Aeronáuticas S.A., Madrid (ES)

( * ) Notice: Subject to any disclaimer, the term of this patent is extended or adjusted under 35 U.S.C. 154(b) by 188 days.

(21) Appl. No.: 14/092,271

(22) Filed: Nov. 27, 2013

(65) Prior Publication Data

US 2014/0158829 A1    Jun. 12, 2014

(30) Foreign Application Priority Data

Nov. 29, 2012    (EP) .................................... 12382475

(51) Int. Cl.
*B64D 39/00*    (2006.01)

(52) U.S. Cl.
CPC ...................................... *B64D 39/00* (2013.01)

(58) Field of Classification Search
CPC ........ B64D 39/00; B64D 39/02; B64D 39/04; B64D 39/06; B64D 37/005
See application file for complete search history.

(56) References Cited

U.S. PATENT DOCUMENTS

| | | | |
|---|---|---|---|
| 5,307,194 A * | 4/1994 | Hatton et al. | 398/130 |
| 6,966,525 B1 | 11/2005 | Schroeder | |
| 7,137,598 B2 | 11/2006 | Von Thal | |
| 7,597,288 B2 * | 10/2009 | Kwok et al. | 244/135 A |
| 8,639,395 B2 * | 1/2014 | Hudson | 701/3 |
| 9,085,370 B2 * | 7/2015 | Lopez et al. | |
| 2013/0068889 A1 * | 3/2013 | Richardson et al. | 244/135 A |
| 2013/0299639 A1 * | 11/2013 | Martinez Vazquez | 244/135 A |
| 2014/0203147 A1 * | 7/2014 | Barsheshet et al. | 244/135 A |
| 2014/0353429 A1 * | 12/2014 | Lopez et al. | 244/135 A |

FOREIGN PATENT DOCUMENTS

| | | | |
|---|---|---|---|
| EP | 2818413 A1 | * | 12/2014 |
| EP | 2879312 | * | 6/2015 |
| WO | WO 2006/085986 A1 | | 8/2006 |
| WO | WO 2011/093886 A1 | | 8/2011 |

OTHER PUBLICATIONS

European Search Report for Application No. 12 382475 dated May 13, 2013.

* cited by examiner

*Primary Examiner* — Brian M O'Hara
*Assistant Examiner* — Christopher Hutchens
(74) *Attorney, Agent, or Firm* — Jenkins, Wilson, Taylor & Hunt, P.A.

(57) ABSTRACT

The invention provides in-flight refueling systems with a communication sub-system available in radio silence operations including at least a first digital wireless data link comprising a first RF transceiver and a second RF transceiver coupled, respectively, to first and second antennas located in two points inside the boom or the hose of the refueling system or in RF communication with them and connected, respectively, to refueling control units in the tanker aircraft and in the free end of the refueling device by data buses allowing a digital communication between them.

11 Claims, 3 Drawing Sheets

IN-FLIGHT REFUELING SYSTEMS WITH A DIGITAL COMMUNICATION SUB-SYSTEM

CROSS-REFERENCE TO RELATED APPLICATION

This application claims priority to European Application Serial No. 12382475.7 filed Nov. 29, 2012 the disclosure of which is incorporated herein by reference in its entirety.

TECHNICAL FIELD

The present invention relates to in-flight refueling systems and more in particular to a digital communication sub-system for facilitating refueling operations of receiver aircraft from a tanker aircraft.

BACKGROUND

A usual method for in-flight refueling operations illustrated in FIG. 1 is based on the use of a boom 18 for interconnecting a tanker aircraft 13 with a receiver aircraft 11. The boom 18 is basically a telescopic or extensible tube attached to the underside of the tanker aircraft 13 by means of an articulation element that provides fuel passage from the tanker aircraft 13 to the receiver aircraft 11. At the tanker aircraft 13, the operator controls visually all steps and procedures for a safe refueling operation. In particular, the operator controls the boom movements until it makes a physical connection with the receptacle of the approaching receiver aircraft 11. Once the refueling operation is finished in a certain session, the boom 18 is hoisted up to its secured position in the tanker aircraft 13.

Another usual method for in-flight refueling operations is called probe and drogue. As illustrated in FIG. 2, this refueling system method employs a flexible hose 19 that trails from a pod 17 in the tanker aircraft 13. The drogue 21 is a fitting resembling a windsock or shuttlecock, attached at its narrow end with a valve to the flexible hose 19. The drogue 21 stabilizes the hose 19 in flight and provides a funnel to aid insertion of the receiver aircraft probe 25 into the hose 19. The hose 19 connects to a drum unit and, when not in use, the hose/drogue is reeled completely into the cited drum unit in the tanker aircraft 13. The receiver aircraft 11 has a probe 25, which is a rigid arm placed on the aircraft's nose or fuselage. This probe 25 is often retracted when not in use, particularly on high speed aircraft. At the end of the probe 25 is a valve that is closed until it mates with the drogue 21, after which it opens and allows fuel to pass from tanker aircraft 13 to receiver aircraft 11.

The refueling operations described above are very sensitive and must be effected in a very precise and accurate way because of security reasons. Particularly a so-called "broken probe" (actually a broken fuel valve, as described above) may happen if a poor flying technique is used by the receiver pilot, or in turbulence.

To facilitate in-flight refueling operations with the above-mentioned methods the prior art teaches the use of different signaling systems in the tanker aircraft and/or in the refueling device to help the pilot of the receiver aircraft in the approach operation to the tanker aircraft as complementary means to radio communications between the tanker and receiver aircraft.

Even though said signaling systems have improved the aerial refueling operations, radio communication between the tanker aircraft and the receiver aircraft are still needed. As this communication means cannot be used in a radio silence environment there is need of a communication system available in said environment.

SUMMARY

It is an object of the present invention to provide in-flight refueling systems with a communication sub-system available in radio silence operations and compatible with the known deployable refueling devices.

This object is met by a communication sub-system including a first digital wireless data link comprising a first RF (Radio Frequency) transceiver and a second RF transceiver coupled, respectively, to first and second antennas located in two points inside a fuel conduit (i.e. at two points of the boom or the hose in the above-mentioned refueling systems) or in RF communication with it (for example, inside conduits connected to the hose through a RF non-blocking window). The boom and the hose are electrically conducting conduits shielded to ground so that they can be used as a waveguide for data transmission. The first RF transceiver is connected to the refueling control unit in the tanker aircraft by a data bus and the second RF transceiver is connected to the refueling control unit at the free end of the refueling device (the control unit of the boom tip assembly or the drogue control unit in the above-mentioned refueling systems) by a data bus allowing a digital communication between them through said first digital wireless data link. The fuel conduit is provided with first and second RF blocking units at both sides of the first and second antennas for preventing the RF propagation outside the first fuel conduit while allowing the fuel flow.

The wireless nature of the data link of the invention avoids the implementation problems of a wired solution in the refueling device to provide secure communications to in-flight refueling systems.

In an embodiment (applicable to a probe and drogue refueling system) the communication sub-system further comprises a second digital wireless data link comprising a third RF transceiver and a fourth RF transceiver coupled to third and fourth antennas located in, respectively, two points inside the hose and the probe or in RF communication with them (at the free end of hose and at the end of probe in the receiver aircraft) so that the probe can be used as a waveguide for data transmission when it is connected to the hose. The third RF transceiver is connected to the drogue control unit by a data bus and the fourth RF transceiver is connected to the refueling control unit at the receiver aircraft by a data bus. The communication sub-system is arranged for interconnecting the first and second RF data links by means of the data bus connection between the second and third RF transceivers through the drogue control unit allowing a digital communication between the tanker and receiver control units. The probe is provided with a third RF blocking unit at one side of the fourth antenna for preventing the RF propagation outside it.

Other desirable features and advantages of the invention will become apparent from the subsequent detailed description of the invention and the appended claims, in relation with the enclosed drawings.

DETAILED DESCRIPTION

Figure 1:
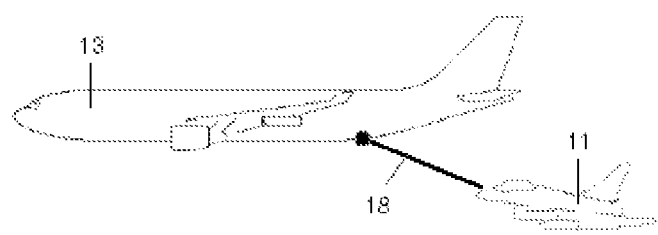
FIG. 1 is a schematic view of a refueling operation between a tanker aircraft and a receiver aircraft using a boom device.
Figure 2:
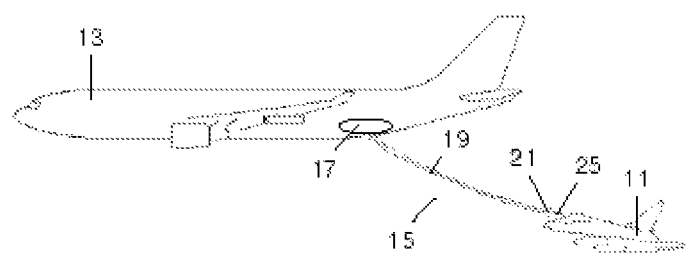
FIG. 2 is a schematic view of a refueling operation between a tanker aircraft and a receiver aircraft using a probe and drogue device.

We will now describe an in-flight refueling system with a communication sub-system according to the invention in reference to the refueling system shown in FIG. 2, i.e. refueling system using a probe and drogue refueling device 15.

Figure 3A:
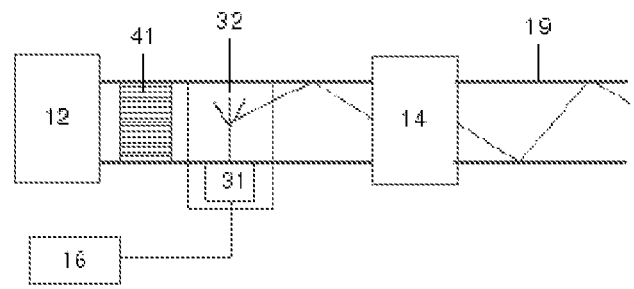
FIGS. 3a and 3b are, respectively, schematic views of the initial and final sections of the hose of a refueling system including a communication sub-system according to a first embodiment of the invention.
Figure 3B:
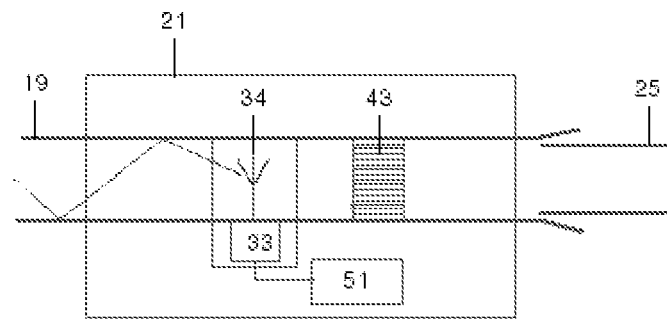

In a first embodiment illustrated in FIGS. 3a and 3b the communication sub-system according to the invention comprises:

A digital wireless data link through the hose 19 between two RF equipment 31, 32; 33, 34 installed at two points close to its both ends.

Two wired data buses between said two RF equipment 31, 32; 33,34 and, respectively, a first control unit 16 in the tanker aircraft 13 and a second control unit 51 in the drogue 21 connected to sensing and operational means of the refueling device.

The hose 19 includes a metallic mesh and is shielded to ground. Therefore in terms of RF transmission over a certain frequency the hose 19 can act as a waveguide, i.e. a conducting tube through which energy is transmitted in the form of electromagnetic waves. The tube acts as a boundary that confines the waves in the enclosed space. The electromagnetic fields are propagated through the waveguide by means of reflections against its inner walls, which are considered perfect conductors and the Faraday cage effect prevents electromagnetic effects from being evident outside of the waveguide so that the tanker and receiver aircraft can use said communication sub-system in radio silence environments.

The communication sub-system therefore allows interchanging digital information between said first and second control units 16, 51 using the hose 19 as radio communication channel.

The information sent from the second control unit 51 to the first control unit 16 can be, for example, data messages referred to drogue attitude, latching indications, fuel delivery pressure, hose tension or drogue acceleration.

The information sent from the first control unit 16 to the second control unit 51 can be, for example, data messages referred to operational commands for those devices connected to the second control unit 51.

In the tanker aircraft side (see FIG. 3a), the communication sub-system comprises:

A first antenna 32 inside the hose 19 at a point between the tanker aircraft 13 and the hose drum 14.

A first RF transceiver 31 coupled to the first antenna 32 and connected by a data bus to the first control unit 16. The housing of the first RF transceiver 31 shall be shielded to ground.

A first RF blocking unit 41 between the first antenna 32 and the fuel tank 12.

In the drogue side (see FIG. 3b), the communication sub-system comprises:

A second antenna 34 inside the hose 19 at a point near its end.

A second RF transceiver 33 coupled to the second antenna 34 and connected by a data bus to the second control unit 51. The second RF transceiver 33 and the second control unit 51 are located inside the housing of the drogue 21 which is shielded to ground.

A second RF blocking unit 43.

The two RF blocking units 41, 43 at both outer sides of first and second antennas 32, 34 prevent the RF propagation outside the hose 19.

The above description is applicable *mutatis mutandi* to a refueling system using a boom device.

Figure 4A:
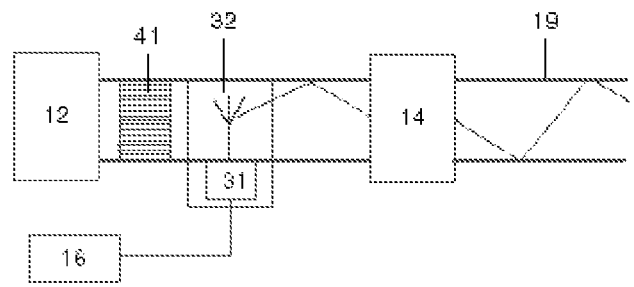
FIGS. 4a, 4b and 4c are, respectively schematic views of the initial and final sections of the hose and of the probe of a refueling system including a communication sub-system according to a second embodiment of the invention.
Figure 4B:
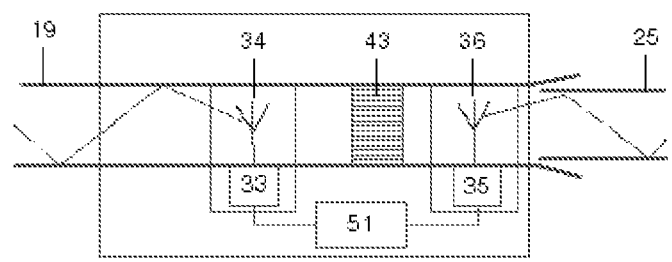
Figure 4C:
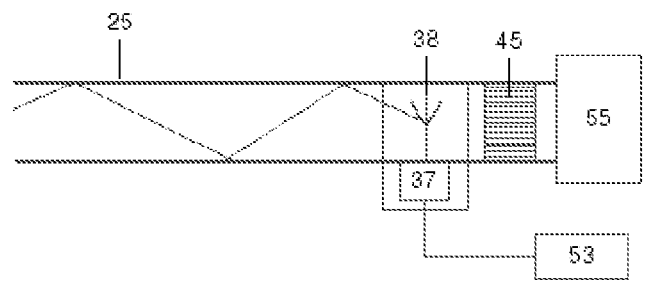

In a second embodiment illustrated in FIGS. 4a, 4b and 4c the communication sub-system according to the invention comprises:

A first digital wireless data link through the hose 19 between two RF equipment 31, 32; 33, 34 installed at two points close to its both ends.

A second digital wireless data link through (mainly) the probe 25 (when connected to the hose 19) between a RF equipment 35, 36 installed at a point in the free end of the hose 19 and a RF equipment 37, 38 installed at a point of the probe 25 near to its end in the receiver aircraft 11.

Two wired data buses between the RF equipment 31, 32; 37, 38 close to the tanker aircraft 13 and the receiver aircraft 11 and, respectively, the first and third control units 16, 53.

A bridge between said first and second digital wireless data links trough data buses connected to the second control unit 51.

The communication sub-system according to this embodiment therefore allows interchanging digital information between said first and third control units 16, 53 using the hose 19 and the probe 25 as radio communication channels.

The information sent from the third control unit 53 to the first control unit 16 can be for example voice messages from the pilot of the receiver aircraft to the refueling operator in the tanker aircraft and data messages referred to requested fuel or the fuel delivery pressure at the receiver aircraft.

The information sent from the first control unit 16 to the third control unit 53 can be for example voice messages from the refueling operator in the tanker aircraft to the pilot of the receiver aircraft and data messages referred to delivered fuel or the delivery time to go.

In the tanker aircraft side (see FIG. 4a), the communication sub-system comprises the same elements as in the previous embodiment.

In the drogue side (see FIG. 4b), the communication sub-system comprises the same elements as in the previous embodiment plus:

A third antenna 36 inside the hose 19 at a nearest point to its border than the second antenna 34, being placed the second RF blocking unit 43 between them.

A third RF transceiver 35 coupled to the third antenna 36 and connected by a data bus to the second control unit 51. The third RF transceiver 35 is located inside the housing of the drogue 21 which is shielded to ground.

In the receiver aircraft side (see FIG. 4c) the communication sub-system comprises:

A fourth antenna 38 inside the probe 25 at a point near the fuel tank 55.

A fourth RF transceiver 37 coupled to the fourth antenna 38 and connected by a data bus to the third control unit 53. The housing of the fourth RF transceiver 37 shall be shielded to ground.

A third RF blocking unit 45 between the fourth antenna 38 and the fuel tank 55.

The two RF blocking units 43, 45 at both outer sides of third and fourth antennas 36, 38 prevent the RF propagation outside the probe 25.

Figure 5:
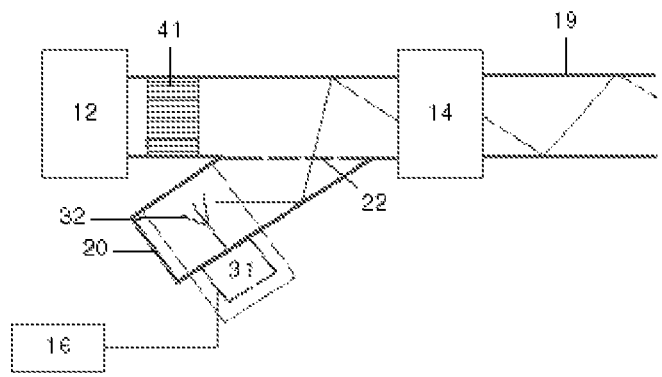
FIG. 5 is view similar to that of FIGS. 3a and 4a with one antenna outside the hose.

In the above description all the antennas 32, 34, 36, 38 were placed inside a fuel conduit. However a communication sub-system according to the invention may include antennas outside the fuel conduit as in the case of the first antenna 32 in the tanker aircraft 13 shown in FIG. 5.

The antenna 32 is placed inside an electrical conducting conduit 20 shielded to ground connected to the hose 19 through a RF non-blocking window 22. The first RF transceiver 31 is coupled to the first antenna 32 and connected by a data bus to the first control unit 16. The housing of the first RF transceiver 31 shall be shielded to ground.

The operational frequency of the above-mentioned RF equipment is dependent of the dimensions of the hose 19 and the probe 25 and the emitting power shall avoid any ignition risk.

For example for a hose of a circular section and a radius of 50 mm the cutoff wavelength is 3.53 Ghz and the maximum emitting power is 5 W/cm2.

Although the present invention has been described in connection with various embodiments, it will be appreciated from the specification that various combinations of elements, variations or improvements therein may be made, and are within the scope of the invention.

The invention claimed is:

1. An in-flight refueling system comprising a tanker aircraft, a receiver aircraft, and a refueling device; the tanker aircraft and receiver aircraft comprising fuel tanks; the refueling device comprising an electrical conducting first fuel conduit shielded to ground connected to the fuel tank of the tanker aircraft; the in-flight refueling system comprising a first control unit in the tanker aircraft, a second control unit in a distal end of the first fuel conduit connected to a sensing and managing structure of the in-flight refueling system, and a third control unit in the receiver aircraft;

the in-flight refueling system further comprising a communication sub-system including a first digital wireless data link comprising a first RF transceiver and a second RF transceiver coupled, respectively, to first and second antennas located at two points inside the first fuel conduit or in RF communication with the first fuel conduit so that the first fuel conduit can be used as a waveguide for data transmission;

the first RF transceiver being connected to the first control unit by a data bus and the second RF transceiver being connected to the second control unit by a data bus for allowing a digital communication between the first and second control units through the first digital wireless data link;

the first fuel conduit also comprising first and second RF blocking units at both sides of the first and second antennas for preventing RF propagation outside the first fuel conduit while allowing a fuel flow.

2. The in-flight refueling system according to claim 1, wherein:

the refueling device is a boom device deployable from the tanker aircraft and connectable to a receptacle of the receiver aircraft in communication with the fuel tank of the receiver aircraft;

the first fuel conduit is a fuel conduit of the boom device.

3. The in-flight refueling system according to claim 1, wherein:

the refueling device comprises a probe and drogue device deployable from the tanker aircraft and a probe deployable from the receiver aircraft;

the probe and drogue device comprises a hose connected to the fuel tank of the tanker aircraft, a drum to reel the hose and a drogue at a free end of the hose;

the probe of the receiver aircraft is connected to the fuel tank of the receiver aircraft;

the first fuel conduit is the hose.

4. The in-flight refueling system according to claim 3, wherein the first and second antennas are located at two points inside the hose in, respectively, an end of the hose in the tanker aircraft and in a free end of the hose.

5. The in-flight refueling system according to claim 4, wherein the first antenna is located between the fuel tank of the tanker aircraft and the drum.

6. The in-flight refueling system according to claim 3, wherein the first and/or the second antennas are located in electrical conducting conduits shielded to ground connected to the hose, through a RF non-blocking window, at, respectively, a point of the hose in the end of the hose in the tanker aircraft and/or in the free end of the hose.

7. The in-flight refueling system according to claim 3, wherein the communication sub-system further comprises a second digital wireless data link comprising a third RF transceiver and a fourth RF transceiver coupled to third and fourth antennas located, respectively, inside the hose and the probe of the receiver aircraft or in RF communication with the respective third and fourth antennas so that the probe of the receiver aircraft can be used as a waveguide for data transmission when the probe of the receiver aircraft is connected to the hose;

the third RF transceiver being connected to the second control unit by a data bus and the fourth RF transceiver being connected to the third control unit by a data bus;

the probe of the receiver aircraft also comprising a third RF blocking unit at one side of the fourth antenna for preventing RF propagation outside the probe of the receiver aircraft;

the communication sub-system being arranged for interconnecting the first and second RF data links through the data bus connection between the second and third RF transceivers through the second control unit allowing a digital communication between the first and third control units.

8. The in-flight refueling system according to claim 7, wherein:

the third antenna is located inside the hose at a point nearer to the free end of the hose than the second antenna, the second RF blocking unit being located between the second and third antennas;

the fourth antenna is located inside the end of the probe in the receiver aircraft.

9. The in-flight refueling system according to claim 7, wherein the third and/or the fourth antennas are located in electrical conducting conduits shielded to ground connected, through a RF non-blocking window, to the hose at a point nearer to the free end of the hose than the second antenna, the second control unit located between them, and/or to a point in the end of the probe in the receiver aircraft.

10. The in-flight refueling system according to claim 1, wherein the RF blocking units comprise metallic honeycomb panels.

11. The in-flight refueling system according to claim 1, wherein the RF transceivers have a maximum emitting power of 5 W/cm2.

* * * * *